(12) United States Patent
Montemont et al.

(10) Patent No.: US 6,346,708 B1
(45) Date of Patent: Feb. 12, 2002

(54) DEVICE AND PROCESS FOR DISCRIMINATION OF PULSES OUTPUT FROM SEMICONDUCTOR RADIATION DETECTORS

(75) Inventors: Guillaume Montemont; Marc Arques, both of Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/577,562

(22) Filed: May 25, 2000

(30) Foreign Application Priority Data

Jun. 2, 1999 (FR) .............................................. 99 06948

(51) Int. Cl.$^7$ .................................................. G01J 1/20
(52) U.S. Cl. ............................ 250/370.01; 250/370.06; 250/370.13; 250/370.08
(58) Field of Search ....................... 250/370.01, 370.06, 250/370.13, 370.08

(56) References Cited

U.S. PATENT DOCUMENTS

| 5,354,991 | A | | 10/1994 | Odell |
| 6,169,287 | B1 | * | 1/2001 | Warburton ............. 250/370.01 |

OTHER PUBLICATIONS

Garcia–Belmonte G Et Al : "Digital implementation of filters for nuclear applications using the discrete wavelet transform" Nuclear Instruments & Methods in Physics Research, Section—A: Accelerators, Spectrometers and Detectors, vol. 380, No. 1, 10, 1996.*

Y. Eisen, et al., "Correction of incomplete charge collection in CdTe detectors," Nuclear Instruments and Methods in Physics Research A 353 (1994) 60–66 —1994 Elsevier Science B.V.

G. Garcia–Belmonte, et al., "Digital implementation of filters for nuclear applications using the discrete wavelet transform," Nuclear Instruments and Methods in Physics Research A 380 (1996) 376–380—1996 Elsevier Science B.V.

M. Richter, et al. "High resolution gamma ray spectroscopy with CdTe detector systems" Nuclear Instruments and Methods in Physics Research A322 (1992) 529–537 North–Holland —1992 Elsevier Science Publishers B.V.

* cited by examiner

Primary Examiner—Scott J. Sugarman
Assistant Examiner—Mohammed Hasan
(74) Attorney, Agent, or Firm—Burns Doane Swecker & Mathis LLP

(57) ABSTRACT

Device for discrimination of electrical pulses output from at least one semiconductor radiation detector, comprising:

at least one means (106a, 106b) of transforming pulses capable of increasing a value of a derivative of the pulse with respect to at least one parameter called the slope parameter, at least one integrator (108a, 108b) capable of establishing a "characterization" value for each transformed pulse, the said value being obtained by integration of the transformed pulse, pulse sort means (110) as a function of their characterization value.

12 Claims, 4 Drawing Sheets

DEVICE AND PROCESS FOR DISCRIMINATION OF PULSES OUTPUT FROM SEMICONDUCTOR RADIATION DETECTORS

TECHNICAL FIELD

This invention relates to a device and a process for discrimination of pulses from semiconductor radiation detectors, and particularly from gamma radiation detectors.

Electrical pulses output by gamma radiation detectors depend on the number of detection parameters, the influence of each of the parameters being variable depending on detection conditions.

In particular, the invention is designed to identify the influence of a number of parameters and, as a function of this influence, to discriminate signals.

Discrimination may consist particularly of selecting pulses and therefore detected "events" that correspond to determined detection conditions, and to reject other pulses.

The invention is used in applications in the gamma spectrometry and nuclear medicine fields.

STATE OF PRIOR ART

An illustration of the state of the art is given below with the reference to examples taken from nuclear medicine.

In nuclear medicine, according to some diagnosis methods, a patient is injected with radio elements in the form of molecules marked by a radioactive tracer, for example such as technetium, iodine or thallium. These molecules will become fixed selectively on some tissues or organs, depending on the type of the molecules.

A gamma camera is then used to detect the gamma radiation produced by the patient, and to constitute an image of the tissues or the organ concerned. The image contrast depends on the fixation of the radioelements by the tissues.

Most gamma cameras used are of the Anger type. One such camera is shown diagrammatically in FIG. 1.

The essential part of the gamma camera is a scintillator crystal 10 equipped with a collimator 12 and a plurality of photomultipliers 14 optically coupled with the scintillator crystal by a transparent material 16.

A central of gravity calculation carried out on the signal output from each photomultiplier in response to an event can be used to identify the location in the scintillator crystal at which the gamma radiation interacts with the material.

This localization is also a means of identifying the position of a radioactive area 18 from which the radiation was emitted. This is possible particularly due to the collimator 12 which, as shown in FIG. 1, is a means of eliminating radiation with incidence not approximately normal to the detector input face.

Gamma radiation that reaches the scintillator crystal, like the ray 20 in FIG. 1, may consist of rays that interact with the detector directly after leaving the radioactive area 18. These rays form part of a phenomenon denoted "direct radiation" in the rest of this text.

On the other hand, other rays interact with the material surrounding the radioactive area one or more times before reaching the scintillator. For example, this is the case of ray 21 in the figure which interacts a first time inside the patient, but outside the radioactive area. After this first interaction, a diffused gamma ray with lower energy reaches the scintillator. This phenomenon is due to the Compton effect and is denoted "diffuse radiation" in the rest of this text.

The figure shows that diffuse radiation can cause incorrect localization of the radioactive area and contribute to degrading the contrast of the medical image by the addition of noise.

As mentioned above, diffuse radiation is characterized by the fact that its energy is lower than the energy of direct radiation.

The contribution of diffuse radiation can be eliminated by making a discrimination between detection signals, in other words rejecting signals for which the amplitude as a function of the energy is less than a given threshold and for which the amplitude as a function of the energy is outside a determined window.

In general, a window is fixed in amplitude around the maximum amplitude value as a function of the energy of the signals for a given emission energy from the radioactive area.

If the window is narrow, the image contrast can be increased by limiting acceptance of diffuse radiation. However, this is done at the detriment of the number of detected effective events, in other words the number of events that can be used for the formation of an image.

Conversely, if the window is too wide, the number of events is greater for a given measurement time, but the image contrast is degraded.

Within the framework of medical imagery applications, it is not possible to inject excessive radioactive doses to patients, and it is not comfortable to prolong the examination duration beyond a certain time. Thus, the number of effective events measured per unit time and the energy resolution of the detector are important parameters.

The energy resolution is taken to be the ratio of the width of the distribution of an energy peak around the value of the emission energy at mid-height, to the emission energy.

A recent development in gamma cameras in which scintillator detectors are replaced by semiconducting detectors, has improved the acquisition of events in terms of efficiency and energy resolution.

Semiconductor detectors, for example such as CdTe, CdZnTe, AsGa, $PbI_2$, directly convert gamma photons into charge carriers. For radiation with the same intensity, the number of charges created is an order of magnitude greater than the number created obtained in indirect detection with scintillator detectors. Thus, the resolution of semiconductor detectors is also improved.

FIG. 2 shows the structure of an individual semiconductor detector 30. Usually, several such detectors are combined together to form a detection head.

The detector in FIG. 2 is in the form of a semiconductor block with two opposite parallel faces on which electrodes 32a, 32b are provided. An electrical field applied to the electrodes causes the migration of charge carriers, in other words electrons and holes formed by the interaction of the radiation with the semiconductor. Electrodes are also provided to collect charges and transfer them to electronic circuits 34 for the formation of a detection signal. This signal is in the form of pulses corresponding to interactions.

These interactions are characterized by the energy that they transfer to the detector and the depth at which they take place in the detector. This depth may be understood as being the distance to be traveled by charges to reach one of the electrodes.

All charges created in the semiconductor do not migrate to the electrodes directly. Defects in semiconductors trap some charge carriers during their migration and reduce their life, particularly when the semiconductor is thick.

The charge created by a gamma radiation is distributed into a charge carried by the electrons and a charge carried by the holes. The mobility of the holes is less than the mobility of the electrons and their collection efficiency is not as good. Thus, not all created charges contribute equally to the finally output detection signal.

In the energy spectrum of the detection signal this results in a "drag", representing a lower energy than the energy of the photons reaching the detector material.

"Drag" is a characteristic of charges being trapped in the material before their collection.

Detected events, the energy of which is less than the energy of actually received gamma photons due to the trapping phenomenon, are then combined with photons resulting from diffuse radiation mentioned above for which the energy is also less than the energy of the direct radiation.

Since the detector electrodes are usually formed on their surface, the trapping phenomenon is directly related to the depth at which the radiation interacts in the detector.

FIG. 3 is a graph that shows the variation of the amplitude (ordinate) as a function of time (abscissa) for different detection signals that may be emitted by a gamma radiation detector according to FIG. 2, under different detection conditions.

The signal reference 41 has the largest amplitude and corresponds to detection of direct radiation that interacted at a shallow depth in the detector.

This signal is useful, for example, for the formation of a medical image.

Signal reference 42 has a lower amplitude. It is derived from a lower energy diffuse radiation that also interacted at shallow depth in the detector.

This is a parasite signal, to the extent that the energy of the interaction that it represents does not correspond to the real energy of the incident radiation. It can cause incorrect localization of the interaction.

As mentioned above, the contribution of this signal may be eliminated by eliminating the signal using an amplitude threshold discrimination device.

The signal mark 43 has approximately the same amplitude as the signal mark 42. However, it is related to a detection event of direct radiation with the same energy as the radiation of signal reference 41.

Its lower amplitude is simply due to the fact that the interaction takes place at a greater depth and that some of the charges have been trapped.

This signal is a useful signal. However, by using an amplitude threshold discrimination like that mentioned above, the signal 43 is eliminated in the same way as a parasite signal corresponding to diffuse radiation.

It can thus be seen that a simple discrimination on the amplitude or on the energy that it represents would arbitrarily eliminate a number of detection events even though they represent a direct interaction. The result is a significant reduction in the detection efficiency and resolution.

Other aspects of the state of the art related to the invention are described in documents 1, 2 and 3, the references of which are given at the end of this description.

DESCRIPTION OF THE INVENTION

The purpose of this invention is to propose a discrimination device and process that can take account of physical parameters that govern the shape of the detection signal in order to more accurately distinguish signals corresponding to direct radiation and signals corresponding to diffuse radiation.

Another purpose is to propose a discrimination method that can be carried out on the signals in real time, for example before they are used for spectrometry or for formation of a medical image.

One particular purpose is to propose a discrimination method capable of taking account of the energy and the interaction depth of the detected radiation.

More precisely, the invention achieves this purpose by using a device for the discrimination of electrical pulses supplied by a semiconductor radiation detector and depending on at least a first and a second detection parameter, the device comprising:

at least one means of transforming pulses outputting a transformed pulse in response to each detector pulse, the transformation means being capable of increasing a value of a derivative of the pulse with respect to at least one parameter called the slope parameter, which is a function of at least one of the first and second detection parameters, at least one integrator capable of setting up a value called the characterization value for each transformed pulse, the said value being obtained by integration of the transformed pulse, and pulse sort means as a function of their characterization value.

The detection parameters may be in particular the interaction energy and depth. Slope parameters may be identical to detection parameters, or may be quadratic values or products of the energy and the interaction depth.

For the purposes of the invention, a slope parameter may be understood as being a parameter that has an influence firstly on the signal amplitude, and secondly on its slope. In this case the slope means the derivative of the pulse with respect to the chosen slope parameter.

The invention is based on the observation that slope parameters as defined above, and in particular the interaction energy and depth, have an influence firstly on the pulse amplitude, and secondly on its shape, in other words on its derivative with respect to the parameters considered.

Transformation means described in more detail in the rest of the text, are provided to amplify the influence of one or several slope parameters on the signal in order to obtain a transformed pulse that is very sensitive to a selected slope parameter.

This transformed pulse is then output to the integrator which carries out an integration in time, over a determined duration. For example, this duration corresponds to the maximum duration of pulses to minimize noise and to not superpose successive pulses.

The characterization value output by the integrator is thus very representative of the influence of one of the slope parameters on the pulse output from the detector.

The characterization value can then be used to make a sort on pulses, or a discrimination. This discrimination can then take uncorrelated account of one or several parameters that have an influence on the pulse and therefore take account of detection conditions.

According to one advantageous aspect of the invention, particularly for the discrimination of electrical pulses affected by noise, the means of transformation of the pulses may include frequency filtering means to make the noise white.

For example, these means may include pass-band filters designed to increase noise within spectral ranges in which noise is low, or reduce noise in spectral ranges in which it is high, in order to obtain approximately white noise. Furthermore, appropriate filtering of the pulse can maximize the signal to noise ratio and thus give good detection energy resolution. The presence of filters is not necessary when pulses are affected by white noise.

The energy resolution is defined in this document as being a ratio between a separation capacity and the energy of the detected gamma photons.

According to a first possible embodiment of the transformation means, they comprise (in order) a pass-band filter and a sublinear gain amplifier between a signal input and output.

In this configuration, the transformation means can be used to essentially accentuate the influence of a slope parameter that depends on the interaction depth.

According to one variant, the pulse transformation means may also comprise (in order) a pass-band filter and a quadratic gain amplifier between a signal input and output. An overlinear gain amplifier can usually be used.

In this configuration, the transformation means can essentially accentuate the influence of a slope parameter that depends on the interaction energy. The transformation is particularly accentuated when the gain of the amplifier is strongly overlinear.

In the devices described above, the choice of a slope parameter related particularly to the interaction energy or particularly to the interaction depth is determined essentially by adjusting the pass-band of the filter and the amplifier gain.

According to another variant, also intended to highlight the influence of the interaction depth, the pulse transformation means may also comprise the following in order between a signal input and output:

a first branch containing a first pass-band filter and a quadratic gain amplifier, a second branch connected in parallel to the first branch, equipped with a second pass-band filter with a pass-band wider than a pass-band of the first filter, an adder connected to the signal output and designed to receive and add signals from the said first and second branches.

In order to achieve discrimination, the device according to the invention may comprise means of memorizing a window of characterization values. Sort means are then provided to compare the characterization value of each pulse with values of the memorized window and to select pulses for which the characterization value coincides with the said window. These means may be in the form of software running on a computer.

According to one improved embodiment, the device may comprise two pulse transformation means to obtain two distinct transformed pulses as a function of two distinct slope parameters, and to establish a pair of distinct characterization values for each pulse. In this case, the device comprises means for memorizing a biparametric window, in other words for memorizing a window with two dimensions, and sort means may be provided to compare each pair of characterization values with the values of the biparametric window and to select pulses for which the two characterization values coincide with the said biparametric window.

The invention also relates to a process for the discrimination of electrical pulses output by a semiconductor radiation detector and dependent on at least one first and one second detection parameter, in which:

each pulse is transformed in order to obtain at least one transformed pulse in which a derivative of the pulse with respect to a parameter, called the slope parameter and that depends on a detection parameter, is increased, the said transformed pulse is integrated to obtain at least one value called the characterization value, pulses are selected according to a criterion based on the said characterization value.

Other characteristics and advantages of the invention will become clearer from the following description with reference to the figures in the attached drawings. This description is given for purely illustrative purposes and is in no way restrictive.

DETAILED DESCRIPTION OF EMBODIMENTS OF THE INVENTION

As mentioned above, the invention is based on the influence of two parameters, essentially the interaction energy and the depth, on detection signals output by one or more semiconductor detectors.

Figure 4:
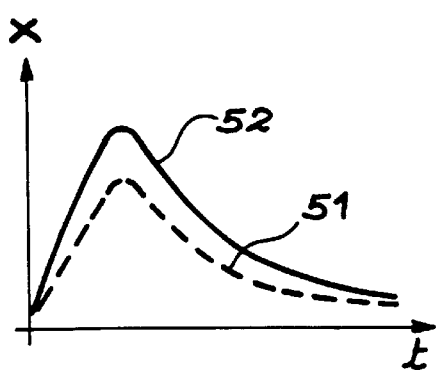
FIG. 4 is a graph that indicates the variation with time of two detection signals output by a semiconductor detector and corresponding to events with different energies at approximately the same depth.

The graph in FIG. 4 shows two signals that are marked references 51 and 52 respectively, corresponding to different energies $E_1$ and $E_2$ such that $E_2>E_1$. The two signals originate from interactions that take place at approximately the same depth.

It can be seen that the amplitude X of signal 52 with the higher energy is greater than the amplitude of signal 51. However, the signals are approximately of the same shape and are therefore approximately similar.

Figure 5:
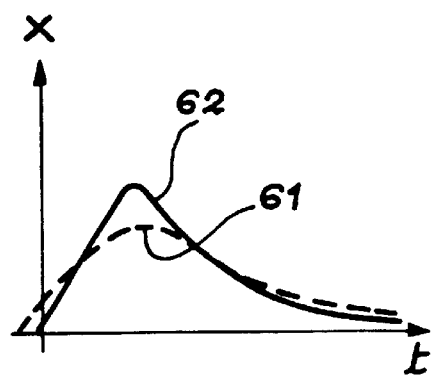
FIG. 5 is a graph that indicates the variation with time of two detection signals output by a semiconductor detector and corresponding to events with approximately the same energy but at different depths.

The graph in FIG. 5 shows two signals with references 61 and 62 respectively corresponding to interactions with approximately the same energy that occur at depths $p_1$ and $p_2$, such that $p_2>p_1$. Note that the signals do not all have the same shape.

Processing of the signals shown in FIGS. 4 and 5 is described in the rest of this description.

Figure 1:
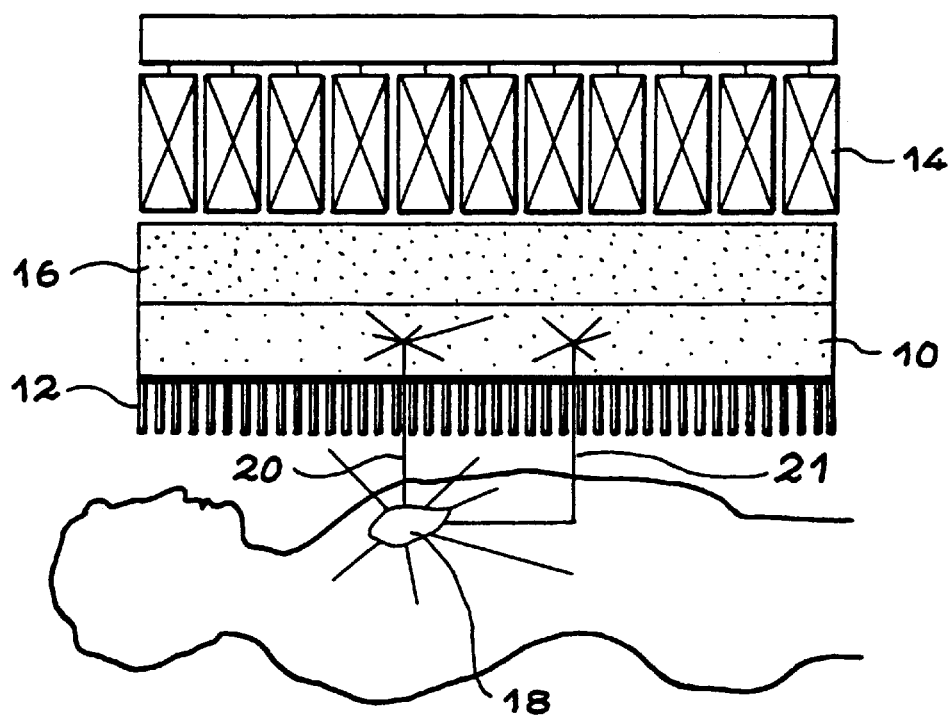
FIG. 1, already described, is a simplified diagrammatic representation showing a section through a conventional Anger type gamma camera detector.
Figure 2:
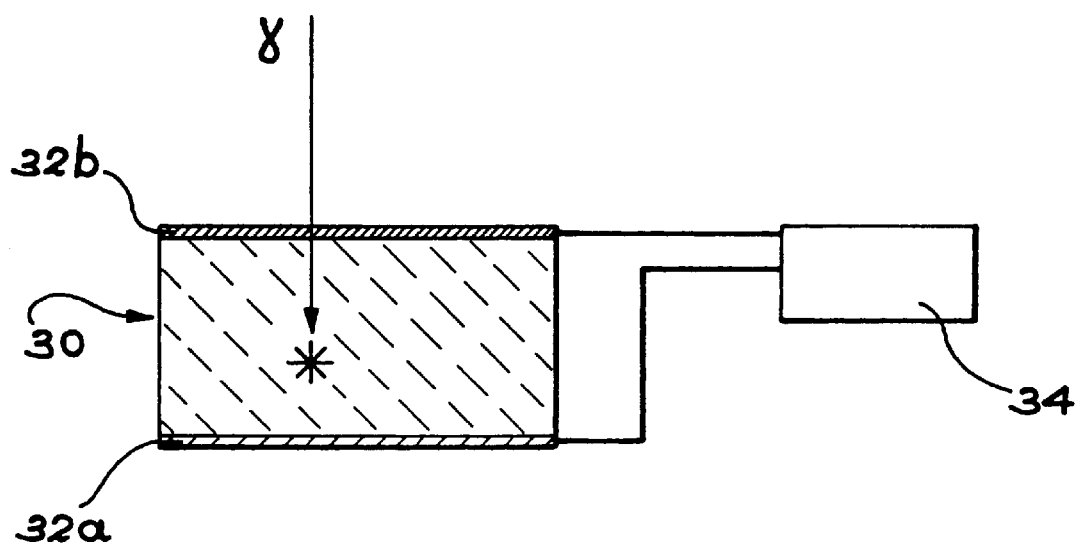
FIG. 2, already described, is a simplified diagrammatic section through an individual semiconductor detector.
Figure 3:
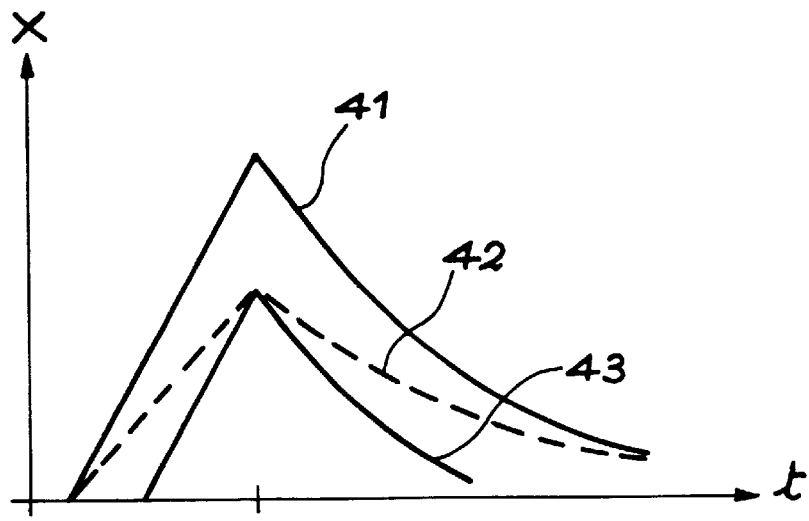
FIG. 3 is a graph that indicates the variation of detection signals from a semiconductor gamma radiation detector with time, for different interaction energy and depth values.
Figure 6:
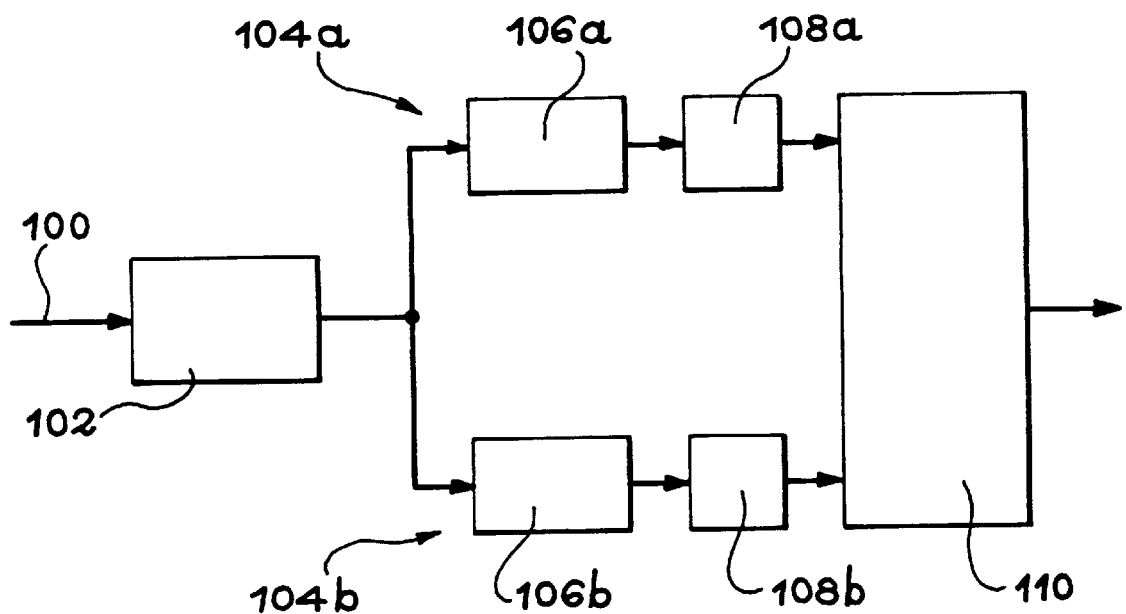
FIG. 6 is a diagrammatic and simplified view of a particular embodiment of a discrimination device according to the invention.

FIG. 6 shows the main elements of a discrimination device according to a particular embodiment of the invention.

Detection signals originating from one or several semiconductor detectors, not shown, are inserted into the device at an input terminal 100. A filter 102, for example of the pass-band type, is connected to input 100 and is used to shape the signals.

In particular, and as described above, the filter may be matched so as to make the contribution of noise superposed on the signals uniform over the detection spectrum. This noise can then be processed as white noise.

The output from filter 102 is input to the first and second channels 104a and 104b each comprising signal transformation means 106a, 106b.

The first signal transformation means 106a is described in further detail in the rest of the text, and is designed to increase the value of the derivative of the pulse with respect to a first slope parameter. In the example described, this first parameter is the interaction energy.

A transformed pulse output by the first transformation means 106a is input into an integrator 108a that takes a sum or an average of the signal over a predetermined duration T, for example equal to the pulse duration.

The value of the sum forms the first characterization value input into sort means 110.

The characterization value denoted $Z_1$ (T) could be expressed mathematically, for example as follows:

$$Z_1(T) = \int_0^T \frac{dX(t)}{dt} \frac{dX(t)}{dE} dt$$

where t is the time, T the integration period, E is the energy and X is a function representing the detection signal.

Similarly, the second signal transformation means 106b, for the second channel 104b is designed to increase the value of the derivative of the pulse with respect to a second slope parameter. In the example illustrated, this second parameter is the interaction depth.

The pulse thus transformed, is input into an integrator 108b that also determines the sum of a signal over a predetermined duration T.

The value of the sum forms a second characterization value also input into sort means 110.

The second characterization value denoted $Z_2$ (T) can be expressed mathematically, for example as follows:

$$Z_2(T) = \int_0^T \frac{dX(t)}{dt} \frac{dX(t)}{dp} dt$$

where p is the depth at which the interaction that caused this processed signal occurred.

Figure 7:
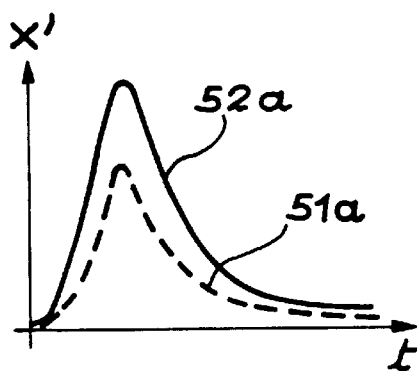
FIGS. 7 and 8 are graphs that indicate the variation with time of two transformed detection signals in a first channel of the discrimination device in FIG. 6.
Figure 8:
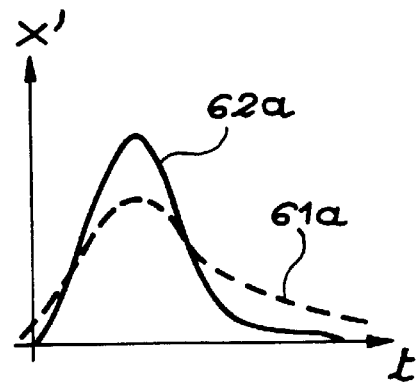

FIGS. 7 and 8 show transformed pulse signals obtained from pulses corresponding to the signals in FIGS. 4 and 5 respectively. The transformed pulse signals in FIGS. 7 and 8 are output by the first transformation means 106a.

References 51a, 52a, 61a, 62a correspond to signals obtained from signals 51, 52, 61, 62 respectively, in FIGS. 4 and 5.

It can be seen that the difference in integrals between the transformed pulse signals 51a and 52a in FIG. 7 is greater than the difference between the initial pulse signals 51 and 52 in FIG. 4.

This shows that the transformation obtained in the first channel 104a is sensitive to the energy. The pulse energy is related to the signal amplitude.

On the other hand, signals 61a and 62a in FIG. 8 are hardly better differentiated in the integral than signals 61 and 62 in FIG. 5.

Figure 9:
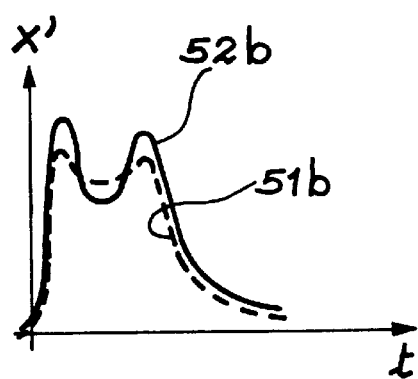
FIGS. 9 and 10 are graphs that indicate the variation with time of two transformed detection signals in a second channel in the discrimination device according to the invention.
Figure 10:
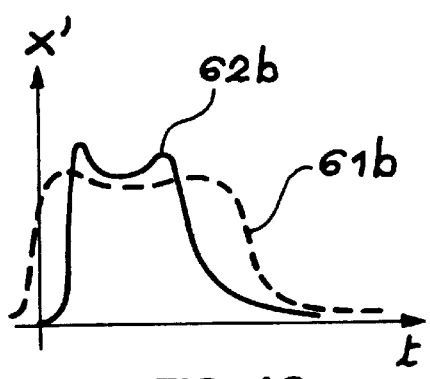

FIGS. 9 and 10 show transformed pulse signals obtained from the initial pulses for the signals shown in FIGS. 4 and 5 respectively. The signals corresponding to transformed pulses are output by the second transformation means 106b.

References 51b, 52b, 61b and 62b correspond to signals obtained by transformation of signals 51, 52, 61, 62 in FIGS. 4 and 5 respectively.

It can be seen that the difference in the integral between signals 61b and 62b from the transformed pulses in FIG. 10 is significantly better than the difference between the initial signals 61 and 62 in FIG. 5.

This shows that the transformation obtained in the second channel 104b of the device in FIG. 6 is sensitive to the interaction depth. The interaction depth is the physical parameter that distinguishes between the pulses corresponding to the signals in FIG. 5.

This distinction is strengthened in the second channel.

On the other hand, signals 51b and 52b in FIG. 9, the shape of which has been modified compared with the initial signals, are not as well differentiated as the signals in FIG. 4.

Figure 11:
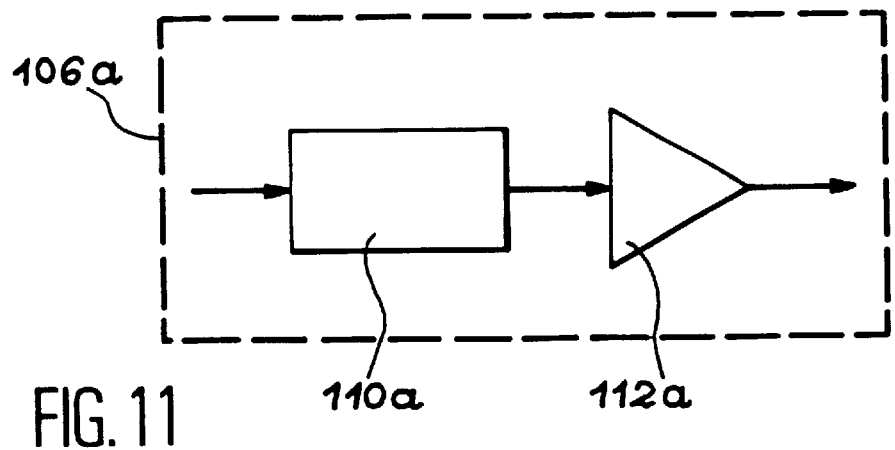
FIGS. 11 and 12 are simplified diagrammatic views of different possible embodiments of different signal transformation means in the discrimination device.

FIG. 11 shows one possible embodiment of pulse transformation means sensitive to the interaction energy. This possibility corresponds to the first transformation means 106a in FIG. 6.

The transformation means comprise (in series and in order) a pass-band filter 110a and a quadratic gain amplifier 112a provided to calculate the square of the received signal.

The filter matching and amplifier gain values are adjusted to get the best possible differentiation of transformed pulses as a function of the energy of the interactions.

It can be seen that if an "energy×depth" parameter is chosen as the transformation parameter, the same quadratic amplifier means can be used as are used for the "energy" parameter.

It would be possible to make pulse transformation means sensitive to the interaction depth, in other words means indicated as reference 106b in FIG. 6, by replacing amplifier 112a by a sub-linear gain amplifier. As the gain becomes increasingly sub-linear, the amplitude of the transformed pulse becomes more nearly constant. Its integration then represents the duration of the initial pulse, in other words the interaction depth.

Figure 12:
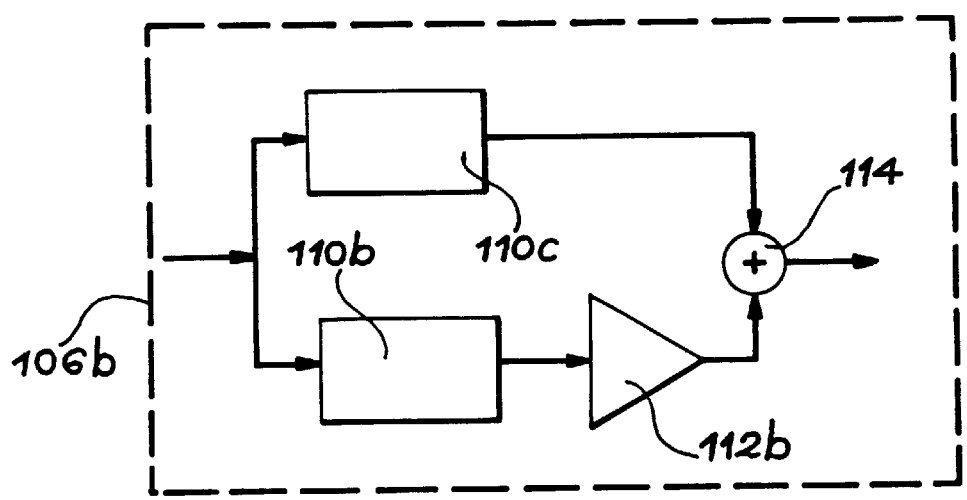

Another possible embodiment of pulse transformation means sensitive to the depth of interactions, in other words actually the second means 106b, is shown in FIG. 12.

The transformation means in FIG. 12 comprise (in order) a first branch with a first pass-band filter 110b and a quadratic gain amplifier 112b, and a second branch connected to the first branch in parallel equipped with a second pass-band filter 110c with a pass-band wider than a pass-band of the first filter.

An adder 114 is provided into which a signal from the first and second branches is input and which outputs a signal corresponding to the sum of the signals.

As explained above, the output from the transformation means is connected to the input of integrators 108a and 108b shown in FIG. 6.

The use of the first and second characterization values output by integrators for discrimination of pulses will now be described with reference to FIG. 13.

Figure 13:
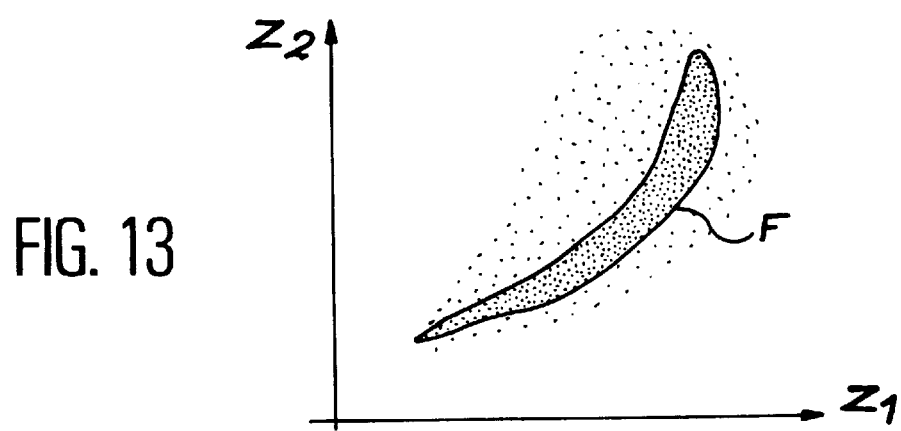
FIG. 13 is a graph showing detection events as a function of characterization values determined by the device according to the invention, and identifying a biparametric discrimination window.

FIG. 13 is a graph showing a two-dimensional space in which each detected interaction is represented by a dot, for which the coordinates are the two characterization values $Z_1$ and $Z_2$ prepared in the two channels 104a and 104b of the device in FIG. 6.

One or several biparametric windows are defined used to sort the pulses in this space.

In the particular example described in this case, a biparametric window delimited by a line F surrounds pairs of characterization values for which the detected interaction can be considered as being a direct interaction.

The window materialized by line F in FIG. 13 may actually be a list of pairs of characterization values considered as being acceptable, or a list of limiting characterization values stored in a memory of the sort means 110 in FIG. 6.

For each new detected pulse, a pair of characterization values is established and these values are compared with the memorized values or the memorized limiting values. As described above, these operations may be carried out by computer.

If the comparison results in a match, or in other words with reference to FIG. 13 if the corresponding event is located inside the window delimited by curve F, the event and the pulse will be kept.

On the other hand, the corresponding event will be rejected if the characterization values are outside memorized values or fixed limits. For example, in the example described, these events correspond to diffuse radiation.

This sort is a means of retaining a number of events for spectrometry or medical imagery purposes.

REFERENCED DOCUMENTS

1

"High resolution gamma ray spectroscopy with CdTe detector systems
M. Richter and P. Siffert
Nuclear Instruments and Methods in Physics Research A 322 (1992) 529–537

2

"Correction of incomplete charge collection in CdTe detectors
Y. Eisen, Y. Horovitz
Nuclear Instruments and Methods in Physics Research A 353 (1994) 60–66

3

"Digital implementation of filters for nuclear applications using the discrete wavelet transform G. Garci-Belmonte et al.
Nuclear Instruments and Methods in Physics Research A 380 (1996) 376–380.

What is claimed is:

1. Device for the discrimination of electrical pulses supplied by a semiconductor radiation detector and depending on at least a first and a second detection parameter, the device comprising:
   at least one means (106a, 106b) of transforming pulses outputting a transformed pulse in response to each detector pulse, the transformation means being capable of increasing a value of a derivative of the pulse with respect to at least one parameter called the slope parameter, which is a function of at least one of the first and second detection parameters,
   at least one integrator (108a, 108b) capable of setting up a value called the characterization value for each transformed pulse, the said value being obtained by integration of the transformed pulse, and
   pulse sort means (1110) as a function of their characterization value.

2. Device according to claim 1, for the discrimination of electrical pulses affected by noise, comprising frequency filtering means (102) to make the noise white.

3. Device according to claim 1, in which the pulse transformation means comprise (in order) a pass-band filter (110a) and a sublinear gain amplifier (112a), between a signal input and output.

4. Device according to claim 1, in which the pulse transformation means comprise (in order) a pass-band filter and a quadratic gain amplifier (112a), between a signal input and output.

5. Device according to claim 1, in which the pulse transformation means may also comprise the following in order between a signal input and output:
   a first branch containing a first pass-band filter (110b) and a quadratic gain amplifier (112b),
   a second branch connected in parallel to the first branch, equipped with a second pass-band filter (110c) with a pass-band wider than a pass-band of the first filter,
   an adder (114) connected to the signal output and designed to receive and add signals from the said first and second branches.

6. Device according to claim 1, in which the first and second parameters are the radiation energy from which the pulses originated, and an interaction depth in the radiation detector, respectively.

7. Device according to claim 6, in which the slope parameter is chosen from either the first or second parameter, one of the first and second parameters squared, or the product of the first parameter and the second parameter.

8. Device according to claim 1, comprising means of memorizing a window of characterization values and in which sort means are provided to compare the characterization value of each pulse with values of the window and to select pulses for which the characterization value coincides with the said window.

9. Device according to claim 1, comprising two pulse transformation means to obtain two distinct transformed pulses as a function of two distinct slope parameters, and to establish a pair of distinct characterization values for each pulse, the device also comprising means for memorizing a biparametric window (F), and sort means for comparing each pair of characterization values with the values of the biparametric window (F) and selecting pulses for which the characterization value coincides with the said biparametric window.

10. Process for the discrimination of electrical pulses output by a semiconductor radiation detector and dependent on at least one first and one second detection parameter, in which:
   each pulse is transformed in order to obtain at least one transformed pulse in which a derivative of the pulse with respect to a parameter, called the slope parameter and that depends on a detection parameter, is increased,
   the said transformed pulse is integrated to obtain at least one value called the characterization value,
   pulses are selected according to a criterion based on the said characterization value.

11. Process according to claim 10, in which at least one characterization value of each pulse is compared with the corresponding values in a characterization values window and pulses are selected for which the said characterization value coincides with the said window.

12. Process according to claim 10, in which two characterization values are determined for each pulse using distinct slope parameters, and the characterization values are compared with the values of the biparametric window.

* * * * *